(12) United States Patent
Khandelwal et al.

(10) Patent No.: US 12,149,404 B1
(45) Date of Patent: Nov. 19, 2024

(54) NETWORK RECORDS FOR DETECTING IMPAIRMENTS WITHIN A SERVICE PROVIDER NETWORK

(71) Applicant: CSC Holdings, LLC, Bethpage, NY (US)

(72) Inventors: Rajesh Khandelwal, Princeton Junction, NJ (US); Shashank Somal, Levittown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 18/501,152

(22) Filed: Nov. 3, 2023

Related U.S. Application Data

(63) Continuation of application No. 17/838,893, filed on Jun. 13, 2022, now Pat. No. 11,863,375.

(51) Int. Cl.
*H04L 41/069* (2022.01)

(52) U.S. Cl.
CPC .................. *H04L 41/069* (2013.01)

(58) Field of Classification Search
CPC .................................................... H04L 41/069
USPC ......................................................... 709/224
See application file for complete search history.

(56) References Cited

U.S. PATENT DOCUMENTS

| 9,026,644 | B2 * | 5/2015 | Parker | H04L 63/1425 |
| | | | | 709/224 |
| 9,031,856 | B2 * | 5/2015 | Trivedi | G06Q 30/06 |
| | | | | 705/7.29 |
| 9,185,464 | B2 * | 11/2015 | Gupta | H04N 21/4882 |
| 9,483,343 | B2 | 11/2016 | Lvin et al. | |
| 9,729,340 | B2 | 8/2017 | Britt et al. | |
| 9,825,839 | B2 * | 11/2017 | Metts | H04L 43/0847 |
| 9,906,405 | B2 | 2/2018 | Mankovskii | |
| 10,033,575 | B2 | 7/2018 | Steeves et al. | |
| 10,051,117 | B2 * | 8/2018 | Zahedi | H04B 3/46 |
| 10,129,114 | B1 * | 11/2018 | Kowalski | H04L 43/0817 |
| 10,133,614 | B2 | 11/2018 | Mankovskii et al. | |
| 10,142,204 | B2 * | 11/2018 | Nickolov | H04L 41/0869 |
| 10,205,627 | B2 | 2/2019 | Kushmerick et al. | |
| 10,212,023 | B2 | 2/2019 | Brown | |
| 10,223,145 | B1 * | 3/2019 | Neogy | G06F 11/1471 |
| 10,292,061 | B2 * | 5/2019 | Chandrashekar | H04L 41/069 |
| 10,298,996 | B2 * | 5/2019 | Rahman | H04L 41/0618 |
| 10,313,181 | B2 * | 6/2019 | Lockyer | H04L 43/0817 |
| 10,326,800 | B2 * | 6/2019 | Raleigh | H04L 63/20 |
| 10,341,217 | B2 * | 7/2019 | Cook | H04L 43/0882 |
| 10,454,801 | B2 | 10/2019 | Lui | |
| 10,491,459 | B1 | 11/2019 | Andreas et al. | |

(Continued)

*Primary Examiner* — Melvin H Pollack
(74) *Attorney, Agent, or Firm* — Sterne, Kessler, Goldstein & Fox P.L.L.C.

(57) ABSTRACT

Systems, methods, and apparatuses can detect whether an impairment is present within a service provider network. The impairment can cause a service provided by the service provider network to not perform as expected. These systems, methods, and apparatuses can develop multiple network records to record the performance of the service provider network at various instances in time. These systems, methods, and apparatuses can compare these network records among each other to detect for the presence of the impairment within the service provider network. These systems, methods, and apparatuses can thereafter diagnose and/or remedy the impairment when present within the service provider network.

20 Claims, 6 Drawing Sheets

(56) References Cited

U.S. PATENT DOCUMENTS

| | | | |
|---|---|---|---|
| 10,552,294 B2 | 2/2020 | Degaonkar et al. | |
| 10,575,066 B2* | 2/2020 | Gorretta | H04H 20/12 |
| 10,700,923 B1* | 6/2020 | Holmer | H04L 43/08 |
| 10,705,899 B2* | 7/2020 | Sprenger | H04L 41/0618 |
| 10,756,959 B1 | 8/2020 | Makwarth et al. | |
| 10,756,996 B2 | 8/2020 | Sareen et al. | |
| 10,826,753 B2* | 11/2020 | Sprenger | H04N 7/147 |
| 10,891,140 B1 | 1/2021 | Levin et al. | |
| 10,911,263 B2* | 2/2021 | Richards | H04L 67/75 |
| 10,992,519 B2 | 4/2021 | Lisle et al. | |
| 10,992,546 B2* | 4/2021 | Mereddy | H04L 41/0895 |
| 11,038,747 B2* | 6/2021 | Beattie, Jr. | H04L 65/80 |
| 11,128,605 B2 | 9/2021 | Chennupalli et al. | |
| 11,165,658 B2 | 11/2021 | Ramanathan et al. | |
| 11,271,677 B2* | 3/2022 | Gleason | H04L 12/2801 |
| 11,323,325 B1 | 5/2022 | Hullahalli et al. | |
| 11,431,557 B1 | 8/2022 | Shrestha et al. | |
| 11,469,983 B1 | 10/2022 | Malov et al. | |
| 11,586,486 B2 | 2/2023 | Jha et al. | |
| 11,627,034 B1 | 4/2023 | Chawathe et al. | |
| 11,641,319 B2* | 5/2023 | Richards | H04L 43/08 709/224 |
| 11,641,385 B1 | 5/2023 | Ferry et al. | |
| 11,863,375 B1* | 1/2024 | Khandelwal | H04L 41/069 |
| 2014/0130111 A1* | 5/2014 | Nulty | H04N 21/6118 725/107 |
| 2018/0139282 A1 | 5/2018 | DeLuca et al. | |
| 2018/0205619 A1* | 7/2018 | Rios | H04L 67/10 |
| 2019/0149424 A1 | 5/2019 | O'Neill et al. | |
| 2021/0306226 A1 | 9/2021 | Westerhof | |
| 2021/0306877 A1 | 9/2021 | Blake et al. | |
| 2022/0109612 A1 | 4/2022 | Bush et al. | |
| 2022/0247760 A1 | 8/2022 | Shanker et al. | |
| 2022/0360494 A1* | 11/2022 | Chunduru Venkata | H04L 67/51 |
| 2023/0012373 A1 | 1/2023 | Moon | |
| 2023/0020193 A1 | 1/2023 | Williams et al. | |
| 2023/0106335 A1 | 4/2023 | Chawla et al. | |
| 2023/0134546 A1 | 5/2023 | Gopalakrishnan et al. | |
| 2023/0300040 A1* | 9/2023 | Bull | H04L 43/16 709/224 |
| 2024/0179048 A1* | 5/2024 | Mishra | G06F 11/0709 |

\* cited by examiner

| NETWORK RECORD FIELDS 502 | NETWORK RECORD VALUES 504 |
|---|---|
| • ACCESS POINT RF LEVEL CHECK 506 | PASS (GREEN) OR FAIL (RED) |
| • ACCESS POINT ONLINE CHECK 508 | PASS (GREEN) OR FAIL (RED) |
| • WIFI EXTENDER STATUS 510 | |
| ON ACCOUNT 516 | NUMERICAL VALUE |
| ONLINE 518 | NUMERICAL VALUE |
| 520.1 { DEVICE MAC ADDRESS 522.1 | ALPHANUMERIC VALUE |
| PLACEMENT 524.1 | OPTIMAL (GREEN), FAIL – TOO FAR (RED), FAIL – TOO CLOSE (RED) |
| CONNECTION STATUS 526.1 | ONLINE (GREEN), OFFLINE (RED) |
| ... | |
| 520.a { DEVICE MAC ADDRESS 522.a | ALPHANUMERIC ADDRESS |
| PLACEMENT 524.a | OPTIMAL (GREEN), FAIL – TOO FAR (RED), FAIL – TOO CLOSE (RED) |
| CONNECTION STATUS 526.a | ONLINE (GREEN), OFFLINE (RED) |
| • DOCSIS RF PARAMETERS 512 | |
| 528.1 { NUMBER OF DOWNSTREAM CHANNELS 530.1 | NUMERICAL VALUE (RED IF INCORRECT NUMBER OF CHANNELS) |
| NUMBER OF DOWNSTREAM CHANNELS IMPAIRED 532.1 | NUMERICAL VALUE (RED IF GREATER THAN ZERO, GREEN IF EQUAL TO ZERO) |
| AVERAGE DOWNSTREAM RECEIVE POWER 534.1 | NUMERICAL VALUE |
| MINIMUM DOWNSTREAM SNR 536.1 | NUMERICAL VALUE |
| 528.2 { NUMBER OF UPSTREAM CHANNELS 530.2 | NUMERICAL VALUE (RED IF INCORRECT NUMBER OF CHANNELS) |
| NUMBER OF UPSTREAM CHANNELS IMPAIRED 532.2 | NUMERICAL VALUE (RED IF GREATER THAN ZERO, GREEN IF EQUAL TO ZERO) |
| AVERAGE UPSTREAM RECEIVE POWER 534.2 | NUMERICAL VALUE |
| MINIMUM UPSTREAM SNR 536.2 | NUMERICAL VALUE |
| • VIDEO STB STATUS 514 | |
| 530.1 { DEVICE MAC 532.1 | ALPHANUMERIC VALUE |
| STATUS 534.1 | PASS (GREEN) OR FAIL (RED) |
| CONNECTION STATUS 536.1 | ONLINE (GREEN) OR OFFLINE (RED) |
| CONNECTION TYPE 538.1 | WIRED OR WIRELESS |
| PLACEMENT 540.1 | OPTIMAL (GREEN), FAIL – TOO FAR (RED) |
| RSSI 542.1 | NUMERICAL VALUE (RED IF OUTSIDE RANGE) |
| WIFI BAND 544.1 | 5 GHz, 2.4 GHz, NA if WIRED |
| ... | |
| 530.b { DEVICE MAC 532.b | ALPHANUMERIC VALUE |
| STATUS 534.b | PASS (GREEN) OR FAIL (RED) |
| CONNECTION STATUS 536.b | ONLINE (GREEN) OR OFFLINE (RED) |
| CONNECTION TYPE 538.b | WIRED OR WIRELESS |
| PLACEMENT 540.b | OPTIMAL (GREEN), FAIL – TOO FAR (RED) |
| RSSI 542.b | INTEGER NUMBER (RED IF OUTSIDE RANGE) |
| WIFI BAND 544.b | 5 GHz, 2.4 GHz, NA if WIRED |

NETWORK RECORDS FOR DETECTING IMPAIRMENTS WITHIN A SERVICE PROVIDER NETWORK

CROSS-REFERENCE TO RELATED APPLICATIONS

The present application claims the benefit of U.S. patent application Ser. No. 17/838,893, filed Jun. 13, 2022, which is incorporated herein by reference in its entirety.

BACKGROUND

A service provider network provides a service, such as communication of video, audio, and/or data to provide some examples, to one or more subscriber premises that are associated with one or more subscribers of the service. In some situations, an impairment, such an error, a fault, and/or a failure to provide some examples, can be present within the service provider network. The error represents a human action that produces an incorrect result. As an example, the error can include failing to plug the electronic device into an appropriate electrical socket. The fault represents a manifestation of an error in an electronic device of the service provider network, also known as a defect or a bug. The fault can be hardware-based that is manifested in the hardware of the service provider network and/or software-based that is manifested in the software executing within the service provider network. The failure represents a deviation of an electronic device of the service provider network from its intended operation. For example, the failure can occur when the electronic device produces the incorrect result or does not perform the correct action. The error, the fault, and/or the failure can cause the service provided by the service provider network to not perform as expected.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 5 graphically illustrates an exemplary network record that can be utilized within the exemplary service provider network according to some exemplary embodiments of the present disclosure.

The present disclosure will now be described with reference to the accompanying drawings.

DETAILED DESCRIPTION OF THE DISCLOSURE

Overview

Systems, methods, and apparatuses disclosed herein can detect whether an impairment is present within a service provider network. In some embodiments, the impairment can cause a service provided by the service provider network to not perform as expected. For example, the impairment can cause a black screen, pixelization of a movie or a television program, lack of sound for the movie or the television program, intermittent connectivity, slow speed, no internet connectivity, no dial-tone, and/or an inability to receive electronic mail (email) messages among others to provide some examples. As to be described in further detail below, these systems, methods, and apparatuses can develop multiple network records to record the performance of the service provider network at various instances in time. In some embodiments, these systems, methods, and apparatuses can compare these network records among each other to detect for the presence of the impairment within the service provider network. In these embodiments, these systems, methods, and apparatuses can thereafter diagnose and/or remedy the impairment when present within the service provider network.

Exemplary Service Provider Network

Figure 1:
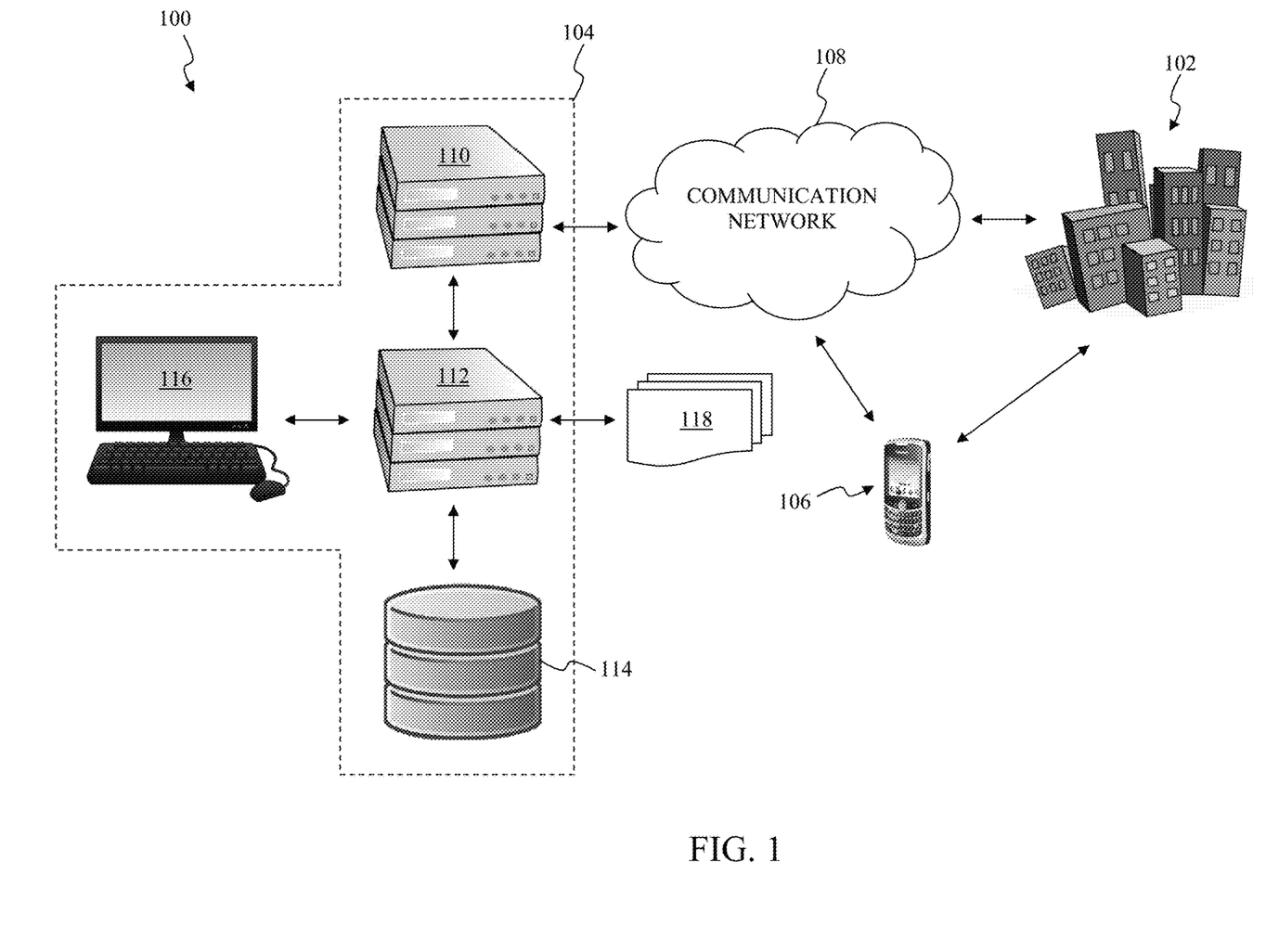
FIG. 1 graphically illustrates an exemplary service provider network according to some exemplary embodiments of the present disclosure.

FIG. 1 graphically illustrates an exemplary service provider network according to some exemplary embodiments of the present disclosure. In the exemplary embodiment illustrated in FIG. 1, a service provider network 100 can detect whether an impairment is present within the service provider network 100. As to be described in further detail below, the impairment can be present anywhere within the service provider network 100, for example, one or more subscriber premises, such as one or more customer home networks within the one or more subscriber premises, a service provider system, a service personnel workstation, and/or a communication network of the service provider network 100. In some embodiments, the impairment can cause a service provided by the service provider network 100 to not perform as expected. For example, the impairment can cause a black screen, pixelization of a movie or a television program, lack of sound for the movie or the television program, intermittent connectivity, slow speed, no internet connectivity, no dial-tone, and/or an inability to receive electronic mail (email) messages among others to provide some examples. As to be described in further detail below, the service provider network 100 can develop multiple network records to record the performance of the service provider network 100 at various instances in time. In some embodiments, the service provider network 100 can compare these network records among each other to detect for the presence of the impairment within the service provider network 100. In these embodiments, the service provider network 100 can thereafter diagnose and/or remedy the impairment when present within the service provider network 100. In the exemplary embodiment illustrated in FIG. 1, the service provider network 100 can include subscriber premises 102, a service provider system 104, a service personnel workstation 106 that are communicatively coupled to one another via a communication network 108.

The subscriber premises 102 represent one or more building and/or non-building structures that receive the service from the service provider network 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In some embodiments, the subscriber premises 102 can include electronic devices that receive the service from the service provider network 100 and/or access points that facilitate the services between the service provider system 104 and the electronic devices via the communication network 108. Generally, the one or more electronic devices represent any suitable mechanical, electrical, and/or electromechanical devices that can communicate electronic information to and/or from the service provider system 104 via the communication network 108 and/or the one or more access points. In some embodiments, the one or more electronic devices can include mobile telephony devices, such as mobile phones, mobile computing devices, mobile internet devices, such as tablet computers and/or laptop computers, video game consoles, portable media players, peripheral devices, such as wireless speakers, mice, keyboards, monitors, printers, and/or scanners, internet capable appliances, smart televisions, video streaming devices, video set-top boxes (STBs), and/or other suitable communication devices that are capable of wireless communication that will be recognized by those skilled in the relevant art(s) without departing from the spirit and scope of the present disclosure. Generally, the one or more access points represent any suitable mechanical, electrical, and/or electromechanical devices that can communicate electronic information to and/or from the subscriber premises 102 via the communication network 108. In some embodiments, the one or more access points can include wireless routers, cable modems, set-top boxes (STBs), digital subscriber line (DSL) modems, WiFi signal extenders, and/or other suitable communication devices that can communicate electronic information to and/or from the subscriber premises 102 via the communication network 108 that will be recognized by those skilled in the relevant art(s) without departing from the spirit and scope of the present disclosure.

The service provider system 104 represents one or more computer systems, an exemplary embodiment of which is to be described in further detail below, which facilitate delivery of the service to the subscriber premises 102. In some embodiments, the service can include, for example, delivery of media content, such as movies, television programs, advertising, and/or electronic programing guides (EPGs) to provide some examples, internet access, and/or telephone service. As illustrated in FIG. 1, the service provider system 104 can detect whether the impairment is present within the service provider network 100. As described above, the impairment can be present anywhere within the service provider system 104 which includes the subscriber premises 102, such as one or more customer home networks within the subscriber premises 102, as described above and the service provider system 104 as to be described in further detail below. And as to be described in further detail below, the service provider system 104 can develop multiple network records to record the performance of the service provider network 100 at various instances in time. In some embodiments, the service provider system 104 can compare these network records among each other to detect for the presence of the impairment within the service provider network 100. In these embodiments, the service provider system 104 can thereafter diagnose and/or remedy the impairment when present within the service provider network 100. In the exemplary embodiment illustrated in FIG. 1, the service provider system 104 can include a service provider server 110, an administrative server 112, a network record repository 114, and/or an administrative workstation 116.

The service provider server 110 provides the service to the subscriber premises 102 to deliver electronic information, such as video, audio, and/or data to provide some examples, to the subscriber premises 102 in a downstream direction. As used herein, the term "downstream direction" refers to the transfer of the electronic information from the service provider system 104 to the subscriber premises 102. As part of the service, the service provider server 110 can receive electronic information, such as video, audio, and/or data to provide some examples, from the subscriber premises 102 in an upstream direction. As used herein, the term "upstream direction" refers to the transfer of the electronic information from the subscriber premises 102 to the service provider system 104.

The administrative server 112 represents one or more computer systems, an exemplary embodiment of which is to be described in further detail below, which manages the service. In the exemplary embodiment illustrated in FIG. 1, the administrative server 112 can develop network records 118 to record the performance of the service provider network 100 at various instances in time. Alternatively, or in addition to, the administrative server 112 can store one or more of the network records 118 in the network record repository 114 which is to be described in further detail below. In some embodiments, these network records can represent multiple "snapshots" of various characteristics, parameters, and/or attributes of the service provider network 100 that characterize the performance of the service provider network 100 at the various instances in time. In these embodiments, these network records can represent multiple "snapshots" of various characteristics, parameters, and/or attributes of one or more of the subscriber premises 102 that characterize the performance of the one or more of the subscriber premises 102 at the various instances in time. In some embodiments, the various instances in time can be, or from among, a periodic instances of time, such as every twenty-four (24) hours, every multiple days, every week, or every month to provide some examples, an aperiodic instances of time, and/or in response to an event, such as a provisioning of electronic devices and/or access points within the subscriber premises 102, a service call being received from a subscriber associated with the subscriber premises 102, and/or a service technician arriving at and/or departing from the subscriber premises 102 to provide some examples.

In the exemplary embodiment illustrated in FIG. 1, the administrative server 112 can determine one or more characteristics, parameters, and/or attributes of the service provider network 100 during the various instances in time to develop the network records 118. In some embodiments, the one or more characteristics, parameters, and/or attributes can include various parameters, characteristics, and/or attributes describing configuration information of one or more of the subscriber premises 102, such as the configuration of the electronic devices and/or the access points within one or more of the subscriber premises 102 to provide an example. In these embodiments, the configuration information can include the make, model, type or brand of the electronic devices and/or the access points; one or more identifiers for the network that is associated with the electronic devices and/or the access points, such as a network identifier (ID) or a network name to provide some examples; one or more locations of the electronic devices and/or the access points; one or more device identifiers of the electronic devices and/or the access points, such as a serial number, a median access controller (MAC) address, and/or an Internet Protocol (IP) address to provide some examples; and/or one or more statuses of the electronic devices and/or the access points, for example, power status information, channel tuning information, device re-boot information, and/or software version installed on the electronic devices and/or the access points.

In some embodiments, the one or more characteristics, parameters, and/or attributes can include various parameters, characteristics, and/or attributes describing operation information of one or more of the subscriber premises 102, such as the operation of the electronic devices and/or the access points within one or more of the subscriber premises 102 to provide an example. In these embodiments, the operation information can include provisioning information of the electronic devices and/or the access points, such as a name of the subscriber, an address of the customer premise, an electronic mail address of the subscriber, a telephone number associated with the subscriber, and/or a payment history of the subscriber. The operational information can include signal strengths of the electronic devices and/or the access points, receiving signal strength of the electronic devices and/or the access points, transmitting signal strength of the electronic devices and/or the access points, speeds of the downstream direction, speeds of the upstream direction, modulation of the digital data being carried, and/format of the digital data being carried to provide some examples. In some embodiments, the operational information can further include health information, for example, a heath score, of the electronic device that is associated with the selected graphical icon.

In some embodiments, the one or more characteristics, parameters, and/or attributes can include historical information that is associated with one or more of the subscriber premises 102, such as historical information of the electronic devices and/or the access points within one or more of the subscriber premises 102 to provide an example. In these embodiments, the historical information can identify one or more impairments that were previously present in the service provider network 100, one or more potential sources of these impairments, and/or one or more previous actions that were performed on these one or more potential sources to remedy these impairments.

In the exemplary embodiment illustrated in FIG. 1, the configuration information, the operation information, and/or the historical information can include, or be related to, one or more radio frequency (RF) communication channels, such as one or more DOCSIS communication channels, that carry the service between the subscriber premises 102 and the service provider system 104, one or more fiber optic communication channels that carry the service between the subscriber premises 102 and the service provider system 104, the electronic devices and/or the access points within one or more of the subscriber premises 102, and/or outcomes from one or more assessments of the service provider network 100, such as a speed test or a Wi-Fi Service Set Identifier (SSID) check to provide some examples.

Upon developing the network records 118, the administrative server 112 can compare the network records 118 among each other to detect for the presence of the impairment. In some embodiments, the administrative server 112 can autonomously compare the network records 118 among each other to proactively monitor the service provider network 100 to detect for the presence of the impairment. Alternatively, or in addition to, the administrative server 112 can compare the network records 118 among each other in response to an event, such as a provisioning of electronic devices and/or access points within the subscriber premises 102, a service call being received from a subscriber associated with the subscriber premises 102, and/or a service technician arriving at and/or departing from the subscriber premises 102 to provide some examples, to detect for the presence of the impairment. In the exemplary embodiment illustrated in FIG. 1, the service provider system 104 can compare one or more characteristics, parameters, and/or attributes from a first network record that was developed at a first instance in time from among the network records 118 and one or more corresponding characteristics, parameters, and/or attributes from a second network record that was developed at a second instance in time from among the network records 118 to detect for the presence of the impairment within the service provider network 100. In some embodiments, the administrative server 112 can develop the first network record at the first instance in time and can retrieve the second network record from the network record repository 114 for comparison. In some embodiments, the administrative server 112 can determine that the impairment is present within the service provider network 100 when the one or more characteristics, parameters, and/or attributes from the first network record differ from the one or more corresponding characteristics, parameters, and/or attributes from the second network record. Additionally, the administrative server 112 can signal the service provider network 100 of the presence of the impairment. In some embodiments, this signaling can include dispatching a service technician to diagnose and/or remedy the impairment when present within the service provider network 100 and/or alerting a subscriber of the service of the presence of the impairment. In these embodiments, the alerting can include sending an electronic mail (email) message and/or a short message service (SMS) text message to a subscriber whose service is affected by the impairment to provide some examples.

The administrative server 112 can diagnose and/or remedy the impairment upon detecting the presence of the impairment. In some embodiments, the administrative server 112 can diagnose one or more mechanical, electrical, and/or electromechanical devices within the service provider network 100 causing different characteristics, parameters, and/or attributes between the first network record and the second network record as causing of the impairment. In this example, the administrative server 112 can cause these mechanical, electrical, and/or electromechanical devices to be repaired, for example, by dispatching a service technician, and/or replaced, for example, by causing delivery of a new mechanical, electrical, and/or electromechanical device, to remedy the impairment.

As illustrated in FIG. 1, the administrative server 112 can store one or more of the network records 118 in the network record repository 114. In some embodiments, the network record repository 114 can include one or more non-transitory machine-readable mediums such as read only memory (ROM), random access memory (RAM), magnetic disk repository media, optical repository media, and/or flash memory devices to provide some examples. In some embodiments, the administrative server 112 can store the network records 118 as an organized collection of data, often referred to as a database, within the network record repository 114. In these embodiments, a database may include one or more data tables having various data values, such as alphanumeric strings, integers, decimals, floating points, dates, times, binary values, Boolean values, and/or enumerations to provide some examples. In some embodiments, the database can be a columnar database, a relational database, a key-store database, a graph database, and/or a document store to provide some examples.

The administrative workstation 116 represents one or more computer systems, an exemplary embodiment of which is to be described in further detail below, which oversees the operation of the service provider network 100. In the exemplary embodiment illustrated in FIG. 1, a customer service representative of the service provider network 100 operating the administrative workstation 116 can receive an inquiry, such as a telephone call, a short message service (SMS) text message, or an electronic mail (email) message to provide some examples, from a subscriber whose service is affected by the impairment. For example, the inquiry can indicate that the subscriber is experiencing a black screen, pixelization of a movie or a television program, lack of sound for the movie or television program, intermittent connectivity, slow speed, no internet connectivity, no dial-tone, and/or an inability to receive electronic mail (email) messages to provide some examples. In some embodiments, the administrative server 112 and/or the administrative workstation 116 can compare the network records 118 among each other to detect for the presence of the impairment in a substantially similar manner as described above. In these embodiments, the administrative workstation 116 can cause the administrative server 112 to develop one of the network records 118 in response to the inquiry received from the subscriber. As an example, the administrative server 112 can provide a first network record that was developed at a first instance in time in response to the inquiry from among the network records 118 and a second network record that was developed at a second instance in time from among the network records 118 to the administrative workstation 116. In this example, the administrative workstation 116 can compare one or more characteristics, parameters, and/or attributes from the first network record and one or more corresponding characteristics, parameters, and/or attributes from the second network record to detect for the presence of the impairment within the service provider network 100 in a substantially similar manner as described above. In some embodiments, the administrative workstation 116 can further diagnose and/or remedy the impairment upon detecting the presence of the impairment in a substantially similar manner as described above. As an example, the administrative workstation 116 can dispatch a service technician to the subscriber premises 102 and/or to cause one or more mechanical, electrical, and/or electromechanical devices to be replaced within the service provider network 100 to remedy the impairment.

The service personnel workstation 106 represents one or more mobile computer systems which oversee the operation of the service provider network 100. In some embodiments, the service personnel workstation 106 can be implemented as one or more mobile telephony devices, such as one or more mobile phones, and/or one or more mobile computing devices, one or more mobile internet devices, such as one or more tablet computers and/or one or more laptop computers, to provide some examples. In the exemplary embodiment illustrated in FIG. 1, the service personnel workstation 106 can compare the network records 118 among each other to detect for the presence of the impairment in a substantially similar manner as described above. As described above, the impairment can be present anywhere within the service provider system 104 which includes the service personnel workstation 106 and the communication network 108 that are to be described in further detail below. In some embodiments, the service personnel workstation 106 can cause the administrative server 112 to develop one of the network records 118 in response to a service technician associated with the service personnel workstation 106 arriving and/or departing from one or more of the subscriber premises 102. In these embodiments, this allows other service technicians that might be dispatched to the one or more of the subscriber premises 102 in the future to easily identify the state of the one or more of the subscriber premises 102. As an example, the administrative server 112 can provide a first network record that was developed at a first instance in time in response to the service technician arriving and/or departing from the one or more of the subscriber premises 102 from among the network records 118 and a second network record that was developed at a second instance in time from among the network records 118 to the service personnel workstation 106. In this example, the service personnel workstation 106 can compare one or more characteristics, parameters, and/or attributes from the first network record and one or more corresponding characteristics, parameters, and/or attributes from the second network record to detect for the presence of the impairment within the service provider network 100 in a substantially similar manner as described above. In some embodiments, the service personnel workstation 106 can further diagnose and/or remedy the impairment upon detecting the presence of the impairment in a substantially similar manner as described above. As an example, the service technician can replace and/or repair one or more mechanical, electrical, and/or electromechanical devices within the service provider network 100 to remedy the impairment.

The communication network 108 communicatively couples the subscriber premises 102 and the service provider system 104. The communication network 108 can implemented as a wireless communication network, a wireline communication network, and/or any combination thereof that will be apparent to those skilled in the relevant art(s) without departing from the spirit and scope of the present disclosure. In some embodiments, the communication network 108 can include a hybrid fiber-coaxial (HFC) network that combines optical fiber and coaxial cable to deliver the electronic information, such as the video, the audio, and/or the data to provide some examples, from the service provider system 104 to the subscriber premises 102 in the downstream direction and/or to deliver the electronic information from the subscriber premises 102 to the service provider system 104 or in the upstream direction. In some embodiments, the communication network 108 can include a fiber to the home (FTTH) network that utilizes optical fiber for at least a portion of the communication network 108 to deliver the electronic information, such as the video, the audio, and/or the data to provide some examples, from the service provider system 104 to the subscriber premises 102 in the downstream direction and/or to deliver the electronic information from the subscriber premises 102 to the service provider system 104 or in the upstream direction.

Exemplary Operations of the Exemplary Service Provider Network

Figure 2:
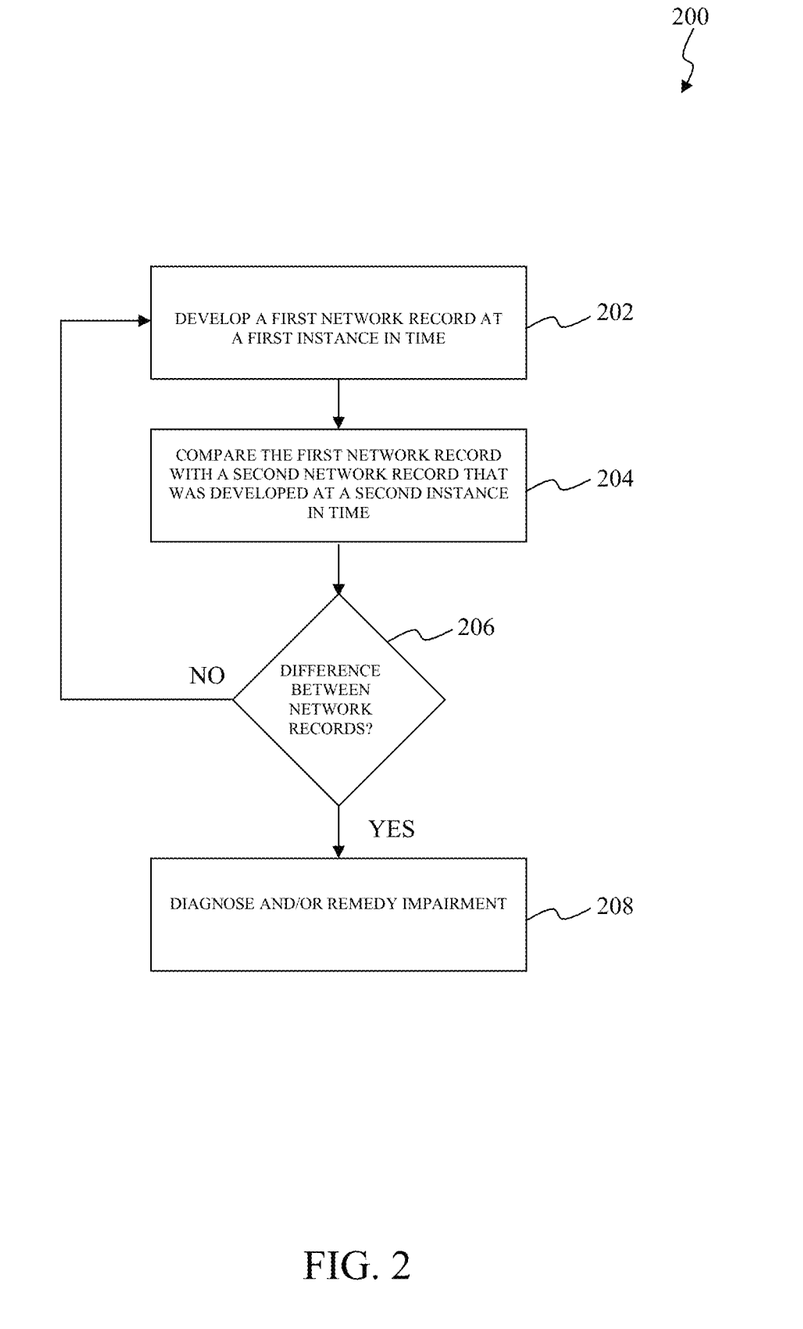
FIG. 2 illustrates a first flowchart of a first exemplary operation for diagnosing and/or remedying an impairment within the exemplary service provider network according to some exemplary embodiments of the present disclosure.

FIG. 2 illustrates a first flowchart of a first exemplary operation for diagnosing and/or remedying an impairment within the exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for diagnosing and/or remedying the impairment within a service provider network, such as the service provider network 100. The operational control flow 200 can be executed by one or more computer systems, such as the service provider system 104 and/or the service personnel workstation 106 as described above in FIG. 1 to provide some examples.

At operation 202, the operational control flow 200 develops a first network record at a first instance in time. In some embodiments, the first instance in time can be from among a periodic instances of time, such as every twenty-four (24) hours, every multiple days, every week, or every month to provide some examples, from among an aperiodic instances of time, and/or in response to an event, such as a provisioning of electronic devices and/or access points within the subscriber premises 102, a service call being received from a subscriber associated with the subscriber premises 102, and/or a service technician arriving at and/or departing from the subscriber premises 102 to provide some examples. The first network record can represent an exemplary embodiment of one of the network records 118 that are described above in FIG. 1. The operational control flow 200 can develop the first network record to record the performance of the service provider network at the first instance in time. In some embodiments, the first network record can include a "snapshot" of various characteristics, parameters, and/or attributes of the service provider network that characterize the performance of the service provider network at the first instance in time. In these embodiments, the operational control flow 200 can measure, estimate, and/or select one or more characteristics, parameters, and/or attributes of the service provider network during the first instance in time to develop the first network record.

At operation 204, the operational control flow 200 compares the first network record from operation 202 with a second network record that was developed at a second instance in time. In some embodiments, the second instance in time can occur prior to the first instance in time. In these embodiments, the second instance in time can be a prior instance of time from among the periodic instances of time, a prior instance of time from among the aperiodic instances of time, and/or in response to a prior event, such as a prior provisioning of electronic devices and/or access points within the subscriber premises 102, a prior service call being received from a subscriber associated with the subscriber premises 102, and/or a prior service technician arriving at and/or departing from the subscriber premises 102 to provide some examples. In these embodiments, the operational control flow 200 can retrieve the second network record from a network record repository, such as the network record repository 114 to provide an example, for comparison. At operation 204, the operational control flow 200 can compare one or more characteristics, parameters, and/or attributes from the first network record from operation 202 and one or more corresponding characteristics, parameters, and/or attributes from the second network record.

At operation 206, the operational control flow 200 determines whether there is a difference between the first network record from operation 202 and the second network record from operation 204 to detect for the presence of the impairment within the service provider network. As described above, the impairment can be present anywhere within the service provider network, for example, one or more subscriber premises, such as one or more customer home networks within the one or more subscriber premises, a service provider system, a service personnel workstation, and/or a communication network of the service provider network. In some embodiments, the operational control flow 200 can determine that the impairment is present within the service provider network when the one or more characteristics, parameters, and/or attributes from the first network record from operation 202 differ from the one or more corresponding characteristics, parameters, and/or attributes from the second network record from operation 204. The operational control flow 200 reverts to operation 202 to develop another first network record when the one or more characteristics, parameters, and/or attributes from the first network record from operation 202 are the same as the one or more corresponding characteristics, parameters, and/or attributes from the second network record from operation 204 indicating that the impairment is not present within the service provider network. Otherwise, the operational control flow 200 proceeds to operation 208 when the one or more characteristics, parameters, and/or attributes from the first network record from operation 202 are different from the one or more corresponding characteristics, parameters, and/or attributes from the second network record from operation 204 indicating that the impairment is present within the service provider network.

At operation 208, the operational control flow 200 can diagnose and/or remedy the impairment detected at operation 206 within the service provider network. In some embodiments, the operational control flow 200 can diagnose one or more mechanical, electrical, and/or electromechanical devices within the service provider network causing different characteristics, parameters, and/or attributes between the first network record and the second network record as being the cause of the impairment. In this example, the operational control flow 200 can cause these mechanical, electrical, and/or electromechanical devices to be repaired, for example, by dispatching a service technician, and/or replaced, for example, by causing delivery of a new mechanical, electrical, and/or electromechanical device, to remedy the impairment. Alternatively, or in addition to, the operational control flow 200 can signal the service provider network of the presence of the impairment detected at operation 206. In some embodiments, this signaling can include dispatching a service technician to diagnose and/or remedy the impairment detected at operation 206 and/or alerting a subscriber of the service of the presence of the impairment detected at operation 206. In these embodiments, the alerting can include sending an electronic mail (email) message and/or a short message service (SMS) text message to a subscriber whose service is affected by the impairment detected at operation 206 to provide some examples.

Figure 3:
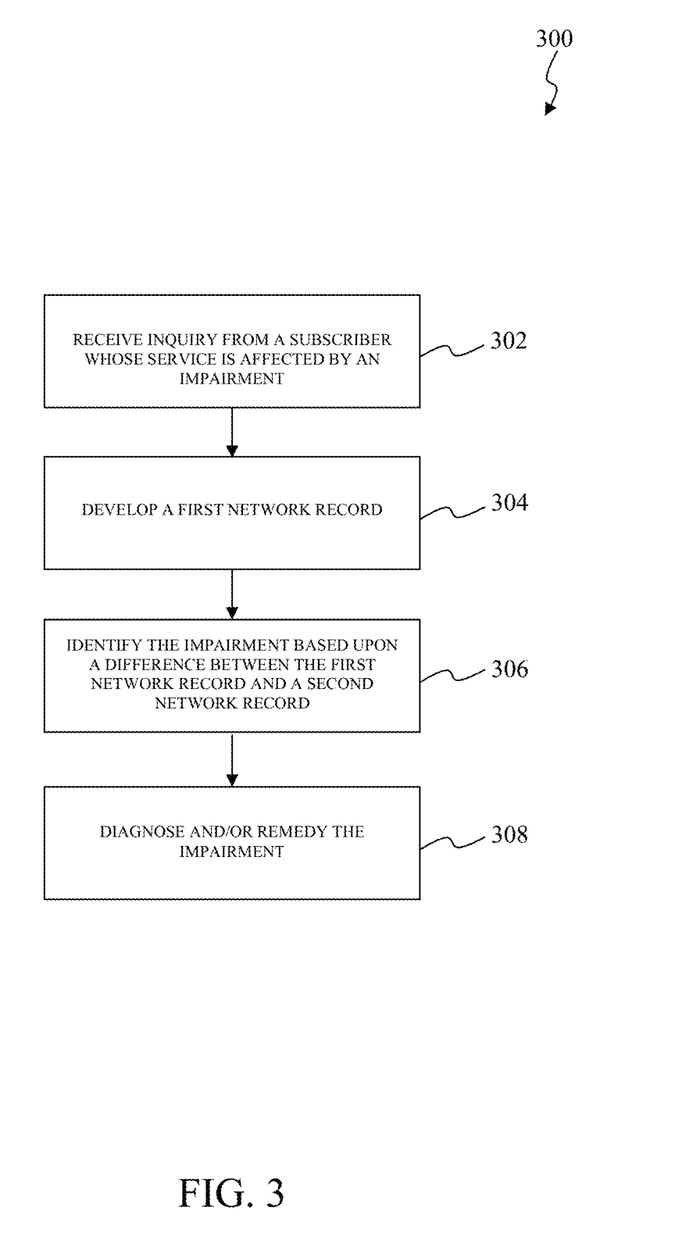
FIG. 3 illustrates a second flowchart of a second exemplary operation for diagnosing and/or remedying the impairment within the exemplary service provider network according to some exemplary embodiments of the present disclosure.

FIG. 3 illustrates a second flowchart of a second exemplary operation for diagnosing and/or remedying the impairment within the exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for diagnosing and/or remedying the impairment within a service provider network, such as the service provider network 100. The operational control flow 300 can be executed by one or more computer systems, such as the administrative workstation 116 as described above in FIG. 1 to provide some examples.

At operation 302, the operational control flow 300 receives an inquiry from a subscriber of a service provided by the service provider network whose service is affected by an impairment that causes the service to not perform as expected. As described above, the impairment can be present anywhere within the service provider network, for example, one or more subscriber premises, such as one or more customer home networks within the one or more subscriber premises, a service provider system, a service personnel workstation, and/or a communication network of the service provider network. In some embodiments, a customer service representative of the service provider network operating the administrative workstation 116 can receive an inquiry, such as a telephone call, a short message service (SMS) text message, or an electronic mail (email) message to provide some examples, from the subscriber whose service is affected by the impairment. For example, the inquiry can indicate that the subscriber is experiencing a black screen, pixelization of a movie or a television program, lack of sound for the movie or television program, intermittent connectivity, slow speed, no internet connectivity, no dial-tone, and/or an inability to receive electronic mail (email) messages to provide some examples.

At operation 304, the operational control flow 300 develops a first network record in response to the inquiry from operation 302. The first network record can represent an exemplary embodiment of one of the network records 118 that are described above in FIG. 1. The operational control flow 300 can develop the first network record in response to the inquiry from operation 302 to record the performance of the service provider network. In some embodiments, the first network record can include a "snapshot" of various characteristics, parameters, and/or attributes of the service provider network that characterize the performance of the service provider network. In these embodiments, the operational control flow 300 can measure, estimate, and/or select one or more characteristics, parameters, and/or attributes of the service provider network in response to the inquiry from operation 302 to develop the first network record.

At operation 306, the operational control flow 300 identifies the impairment from operation 302 based upon a difference between the first network record from operation 302 and a second network record that was developed prior to receiving the inquiry from operation 302. In some embodiments, the operational control flow 300 can determine which one or more characteristics, parameters, and/or attributes differ between the first network record from operation 304 and the second network record. In these embodiments, these differences between the first network record from operation 302 and the second network record can be characterized as being related to, for example, causing, the impairment from operation 302.

At operation 308, the operational control flow 300 can diagnose and/or remedy the impairment from operation 302. In some embodiments, the operational control flow 300 can diagnose one or more mechanical, electrical, and/or electromechanical devices within the service provider network causing the impairment from operation 302. In this example, the operational control flow 300 can cause these mechanical, electrical, and/or electromechanical devices to be repaired, for example, by dispatching a service technician, and/or replaced, for example, by causing delivery of a new mechanical, electrical, and/or electromechanical device, to remedy the impairment. Alternatively, or in addition to, the operational control flow 300 can signal the service provider network of the presence of the impairment from operation 302. In some embodiments, this signaling can include dispatching a service technician to diagnose and/or remedy the impairment from operation 302 and/or alerting the subscriber from operation 302, or another subscriber of the service, of the presence of the impairment from operation 302. In these embodiments, the alerting can include sending an electronic mail (email) message and/or a short message service (SMS) text message to the subscriber from operation 302, or the other subscriber, to provide some examples.

Figure 4:
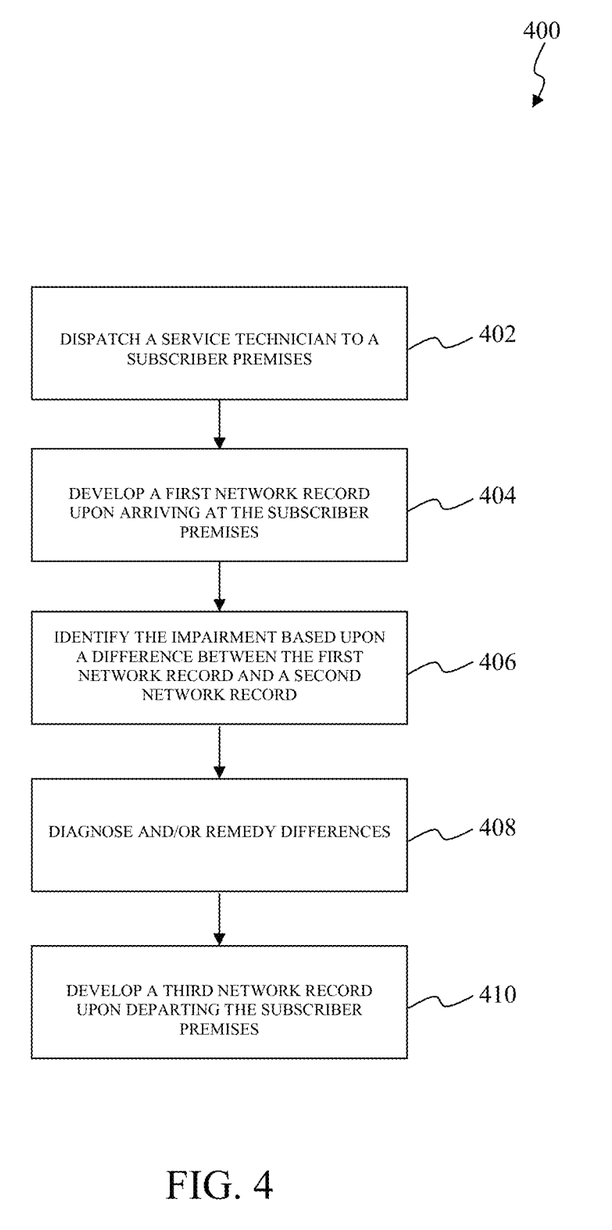
FIG. 4 illustrates a third flowchart of a third exemplary operation for diagnosing and/or remedying the impairment within the exemplary service provider network according to some exemplary embodiments of the present disclosure.

FIG. 4 illustrates a third flowchart of a third exemplary operation for diagnosing and/or remedying the impairment within the exemplary service provider network according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for diagnosing and/or remedying the impairment within a service provider network, such as the service provider network 100. The operational control flow 400 can be executed by one or more computer systems, such as the service personnel workstation 106 as described above in FIG. 1 to provide some examples.

At operation 402, the operational control flow 400 dispatches a service technician of the service provider network to a subscriber premises to diagnose and/or remedy an impairment that causes a service provided by the service provider network to not perform as expected. The subscriber premises can represent an exemplary embodiment of one of the subscriber premises 102 that are described above in FIG. 1. In some embodiments, a customer service representative of the service provider network can receive an inquiry, such as a telephone call, a short message service (SMS) text message, or an electronic mail (email) message to provide some examples, from the subscriber whose service is affected by the impairment. For example, the inquiry can indicate that the subscriber is experiencing a black screen, pixelization of a movie or a television program, lack of sound for the movie or television program, intermittent connectivity, slow speed, no internet connectivity, no dial-tone, and/or an inability to receive electronic mail (email) messages to provide some examples. In this example, the customer service representative can dispatch the service technician to the subscriber premises to diagnose and/or remedy the black screen, the pixelization of the movie or the television program, the lack of sound for the movie or television program, the intermittent connectivity, the slow speed, the no internet connectivity, the no dial-tone, and/or the inability to receive electronic mail (email) messages to provide some examples.

At operation 404, the operational control flow 400 develops a first network record in response to the service technician from operation 402 arriving at the subscriber premises. The first network record can represent an exemplary embodiment of one of the network records 118 that are described above in FIG. 1. The operational control flow 400 can develop the first network record to record the performance of the service provider network upon the service technician from operation 402 arriving at the subscriber premises. In some embodiments, the first network record can include a "snapshot" of various characteristics, parameters, and/or attributes of the service provider network that characterize the performance of the service provider network upon the service technician from operation 402 arriving at the subscriber premises. In these embodiments, the operational control flow 400 can measure, estimate, and/or select one or more characteristics, parameters, and/or attributes of the service provider network upon the service technician from operation 402 arriving at the subscriber premises to develop the first network record.

At operation 406, the operational control flow 400 identifies the impairment from operation 402 based upon a difference between the first network record from operation 402 and a second network record that was developed prior to the service technician from operation 402 arriving at the subscriber premises. In some embodiments, the operational control flow 400 can determine which one or more characteristics, parameters, and/or attributes differ between the first network record from operation 404 and the second network record. In these embodiments, these differences between the first network record from operation 402 and the second network record can be characterized as being related to, for example, causing, the impairment from operation 402.

At operation 408, the operational control flow 400 can diagnose and/or remedy the impairment from operation 402. In some embodiments, the operational control flow 400 can diagnose one or more mechanical, electrical, and/or electro-mechanical devices within the service provider network causing the impairment from operation 402. In this example, the operational control flow 400 can cause the service technician from operation 402 to repair and/or replace these mechanical, electrical, and/or electromechanical devices to remedy the impairment.

At operation 410, the operational control flow 400 develops a third network record in response to the service technician from operation 402 departing from the subscriber premises. The third network record can represent an exemplary embodiment of one of the network records 118 that are described above in FIG. 1. The operational control flow 400 can develop the third network record to record the performance of the service provider network upon the service technician from operation 402 departing from the subscriber premises. In some embodiments, the third network record can include a "snapshot" of various characteristics, parameters, and/or attributes of the service provider network that characterize the performance of the service provider network upon the service technician from operation 402 departing from subscriber premises. In these embodiments, the operational control flow 400 can measure, estimate, and/or select one or more characteristics, parameters, and/or attributes of the service provider network upon the service technician from operation 402 departing at the subscriber premises to develop the third network record. The third network record allows other service technicians of the service provider network to verify that the impairment from operation 402 has been remedied in operation 408.

Exemplary Network Record that can be Utilized within the Exemplary Service Provider Network FIG. 5 graphically illustrates an exemplary network record that can be utilized within the exemplary service provider network according to some exemplary embodiments of the present disclosure. One or more computer systems of a service provider network, such as the administrative server 112 of the service provider network 100 to provide an example, can develop network records, such as one or more of the network records 118 as described above in FIG. 1 to provide an example, to record the performance of a subscriber premises, such as one or more of the subscriber premises 102 to provide an example, in delivering a service provided by the service provider network at various instances in time. In some embodiments, these computer systems can compare these network records among each other to detect for the presence of an impairment within the service provider network that can cause the service to not perform as expected in a substantially similar manner as described above in FIG. 1. The discussion of FIG. 5 to follow is to describe an exemplary embodiment of one or more of these network records. However, those skilled in the relevant art(s) will recognize that other network records are possible without departing from the spirit and scope of the present disclosure.

In the exemplary embodiment illustrated in FIG. 5, a network record 500 includes network record fields 502 having corresponding values from among network record values 504. Generally, the network record fields 502 represent exemplary characteristics, parameters, and/or attributes of the subscriber premises that characterize the performance of the subscriber premises in delivering the service at the specific instance in time. However, the exemplary characteristics, parameters, and/or attributes of the service provider network are for exemplary purposes only. Those skilled in the relevant art(s) with recognize that other characteristics, parameters, and/or attributes of the subscriber premises are possible for the network record 500 without departing from the spirit and scope of the present disclosure. Generally, the network record values 504 can be characterized as being various alphabetical, numerical, and/or alphanumerical values. In some embodiments, the network record values 504 can be assigned to various color codes to allow a customer service representative and/or a service technician viewing the network record 500 to quickly identify the characteristics, parameters, and/or attributes of the service provider network that are causing the impairment. For example, the network record values 504 can be assigned to a first color code, such as green, when the network record values 504 are conducive to delivering the service or to a second color code, such as red, when the network record values 504 are not conducive to delivering the service. Exemplary green and/or red color codes for the network record values 504 are illustrated in FIG. 5.

As illustrated in FIG. 5, the network record 500 represents "snapshot" of network record fields 502 that characterize the performance of the subscriber premises at the various instances in time. In the exemplary embodiment illustrated in FIG. 5, the network record fields 502 can include an <<access point radio frequency (RF) level check>> field 506, an <<access point online check>> field 508, an <<WiFi extender status>> field 510, a <<DOCSIS RF parameters>> field 512, and/or a <<Video STB status>> field 514.

In the exemplary embodiment illustrated in FIG. 5, the <<access point RF level check>> field 506 indicates whether the signal strength of the radio waves that are received by an access point of the subscriber premises are sufficient to deliver the service. Generally, the radio waves should have a signal strength, for example, greater than −55 dBm to ensure the subscriber premises delivers the best service. In some embodiments, a signal strength, for example, greater than −70 dBm is acceptable but may result in a degraded service, for example, poor video experience, being delivered by the subscriber premises. In some embodiments, a signal strength less than, for example, −70 dBm often results in a severely degraded experience being delivered by the subscriber premises. As illustrated in FIG. 5, the network record values 504 for the <<access point RF level check>> field 506 can be a <<PASS>> value to indicate that the radio waves received by the access point have a signal strength, for example, greater than −70 dBm or a <<FAIL>> value to indicate that the radio waves received by the access point have a signal strength, for example, greater less than −70 dBm. It should be noted that the various signal strengths, for example, −70 dBm, referred to in the description of FIG. 5 are for illustrative purposes only and not limiting. Those skilled in the relevant art(s) will other signal strengths are possible without departing from the spirit and scope of the present disclosure. As an example, different wireless technologies, for example, WiFi6, WiFI6E, and/or WiFi7 can have different signal strengths than those as described within the description of FIG. 5. In the exemplary embodiment illustrated in FIG. 5, the <<access point online check>> field 508 identifies whether the access point of the subscriber premises is online to deliver the service. As illustrated in FIG. 5, the network record values 504 for the <<access point online check>> field 508 can be a <<PASS>> value to indicate that the subscriber premises is online to deliver the service or a <<FAIL>> value to indicate that the subscriber premises is offline and cannot deliver the service.

In the exemplary embodiment illustrated in FIG. 5, the <<WiFi extender status>> field 510 identifies one or more parameters, characteristics, and/or attributes relating to one or more WiFi signal extenders within the subscriber premises. As illustrated in FIG. 5, the <<WiFi extender status>> field 510 can include an <<on account>> field 516 having a numerical value from among the network record values 504 indicating the number of WiFi signal extenders within the subscriber premises and an <<online>> field 518 having a numerical value from among the network record values 504 indicating the number of WiFi signal extenders within the subscriber premises that are online. In the exemplary embodiment illustrated in FIG. 5, the <<WiFi extender status>> field 510 can further include one or more parameters, characteristics, and/or attributes for each of the WiFi signal extenders, denoted as WiFi signal extenders 520.1 through 520.a, within the subscriber premises. In some embodiments, the <<WiFi extender status>> field 510 can further include <<device median access controller (MAC) address>> fields 522, <<placement>> fields 524, and/or <<connection status>> fields 526 for each of the WiFi signal extenders 520.1 through 520.a within the subscriber premises. As illustrated in FIG. 5, the network record values 504 for the <<device median access controller (MAC) address>> fields 522 can be alphanumerical values. As illustrated in FIG. 5, the network record values 504 for the <<placement>> fields 524 can be an <<OPTIMAL>> value to indicate that the corresponding WiFi signal extender is optimally placed within the subscriber premises, a <<FAIL—TOO FAR>> value to indicate that the corresponding WiFi signal extender is too far from the access point of the subscriber premises in terms of distance, or a <<FAIL—TOO CLOSE>> value to indicate that the corresponding WiFi signal extender is too close from the access point of the subscriber premises in terms of distance. As illustrated in FIG. 5, the network record values 504 for the <<connection status>> fields 526 can be an <<ONLINE>> value to indicate that the corresponding WiFi signal extender is online to deliver the service or an <<OFFLINE>> value to indicate that the corresponding WiFi signal extender is offline and cannot deliver the service.

In the exemplary embodiment illustrated in FIG. 5, the <<DOCSIS RF parameters>> field 512 identifies one or more parameters, characteristics, and/or attributes relating the delivery of electronic information, such as video, audio, and/or data to provide some examples, to the subscriber premises in the downstream direction and/or from the subscriber premises in the upstream direction. As illustrated in FIG. 5, the <<DOCSIS RF parameters>> field 512 includes a <<downstream direction>> field 528.1 and an <<upstream direction>> field 528.2. In some embodiments, the downstream direction>> field 528.1 includes a <<number of downstream channels>> field 530.1 that identifies the number of downstream channels being used to deliver the electronic information in the downstream direction, a <<number of downstream channels impaired>> field 532.1 that identifies the number of downstream channels that are impaired, an <<average received power>> field 534.1 that identifies the signal strength of the signals carrying the electronic information in the downstream direction and/or a <<minimum downstream signal-to-noise ratio (SNR)>> field 536.1 that identifies the signal to noise ratio of the signals carrying the electronic information in the downstream direction. Generally, the <<average received power>> field 534.1 should have a signal strength, for example, between −8 dBm and 8 dBm to ensure the subscriber premises delivers the best service. In some embodiments, a signal strength, for example, between −15 dBm and 15 dBm for the <<average received power>> field 534.1 is acceptable. In some embodiments, a signal strength, for example, less than −15 dBm and/or greater than 15 dBm often results in a severely degraded experience being delivered by the subscriber premises. Generally, a received signal strength indicator (RSSI) value for the <<minimum downstream SNR>> field 536.1 should be, for example, greater than 30 dB. In some embodiments, the RSSI value for the <<minimum downstream SNR> field 536.1 being, for example, less than 25 dB often results in a severely degraded experience being delivered by the subscriber premises.

In some embodiments, the upstream direction>> field 528.2 includes a <<number of upstream channels>> field 530.2 that identifies the number of upstream channels being used to deliver the electronic information in the upstream direction, a <<number of upstream channels impaired>> field 532.2 that identifies the number of upstream channels that are impaired, an <<average received power>> field 534.2 that identifies the signal strength of the signals carrying the electronic information in the upstream direction and/or a <<minimum upstream signal-to-noise ratio (SNR)>> field 536.2 that identifies the signal to noise ratio of the signals carrying the electronic information in the upstream direction. Generally, the <<average received power>> field 534.2 should have a signal strength between 40 dBm and 50 dBm to ensure the subscriber premises delivers the best service. In some embodiments, a signal strength, for example, between 35 dBm and 55 dBm for the <<average received power>> field 534.2 is acceptable. Generally, a received signal strength indicator (RSSI) value for the <<minimum upstream SNR>> field 536.2 should be, for example, greater than 30 dB. In some embodiments, the RSSI value for the <<minimum upstream SNR>> field 536.2 being, for example, less than 25 dB often results in a severely degraded experience being delivered by the subscriber premises.

In the exemplary embodiment illustrated in FIG. 5, the <<video STB status>> field 514 identifies one or more parameters, characteristics, and/or attributes relating to one or more video set-top boxes (STBs) within the subscriber premises. As illustrated in FIG. 5, the <<video STB status>> field 514 can include one or more parameters, characteristics, and/or attributes for each of the one or more video STBs, denoted as video STBs 530.1 through 530.b, within the subscriber premises. In some embodiments, the <<video STB status>> field 514 can include <<device median access controller (MAC) address>> fields 532, <<status>> fields 534, <<connection status>> fields 536, <<connection type>> fields 538, <<placement>> fields 540, <<RSSI>> fields 542, and <<WIFI band>> fields 544 for each of the video STBs 530.1 through 530.b within the subscriber premises. As illustrated in FIG. 5, the network record values 504 for the <<device median access controller (MAC) address>> fields 532 can be alphanumerical values. As illustrated in FIG. 5, the network record values 504 for the <<status>> fields 534 can be a <<PASS>> value to indicate that the subscriber premises is online to deliver the service or a <<FAIL>> value to indicate that the subscriber premises is offline and cannot deliver the service. As illustrated in FIG. 5, the network record values 504 for the <<connection status>> fields 536 can be an <<ONLINE>> value to indicate that the corresponding video STB is online to deliver the service or an <<OFFLINE>> value to indicate that the corresponding video STB is offline and cannot deliver the service. As illustrated in FIG. 5, the network record values 504 for the <<connection type>> fields 538 can be wired or wireless As illustrated in FIG. 5, the network record values 504 for the <<placement>> fields 540 can be an <<OPTIMAL>> value to indicate that the corresponding video STB is optimally placed within the subscriber premises or a <<FAIL—TOO FAR>> value to indicate that the corresponding video STB is too far from the access point of the subscriber premises in terms of distance. As illustrated in FIG. 5, the network record values 504 for the <<RSSI>> fields 542 can be a numerical value indicating the received signal strength of the radio waves that are received by the corresponding video STB. As illustrated in FIG. 5, the network record values 504 for the <<WIFI band>> fields 544 can be <<5 GHz>> when the corresponding video STB is operating in the 5 GHz unlicensed band, <<2.4 GHz>> when the corresponding video STB is operating in the 2.4 GHz unlicensed band, or <<NA>> if the <<connection type>> fields 538 indicate the corresponding video STB is wired.

Figure 6:
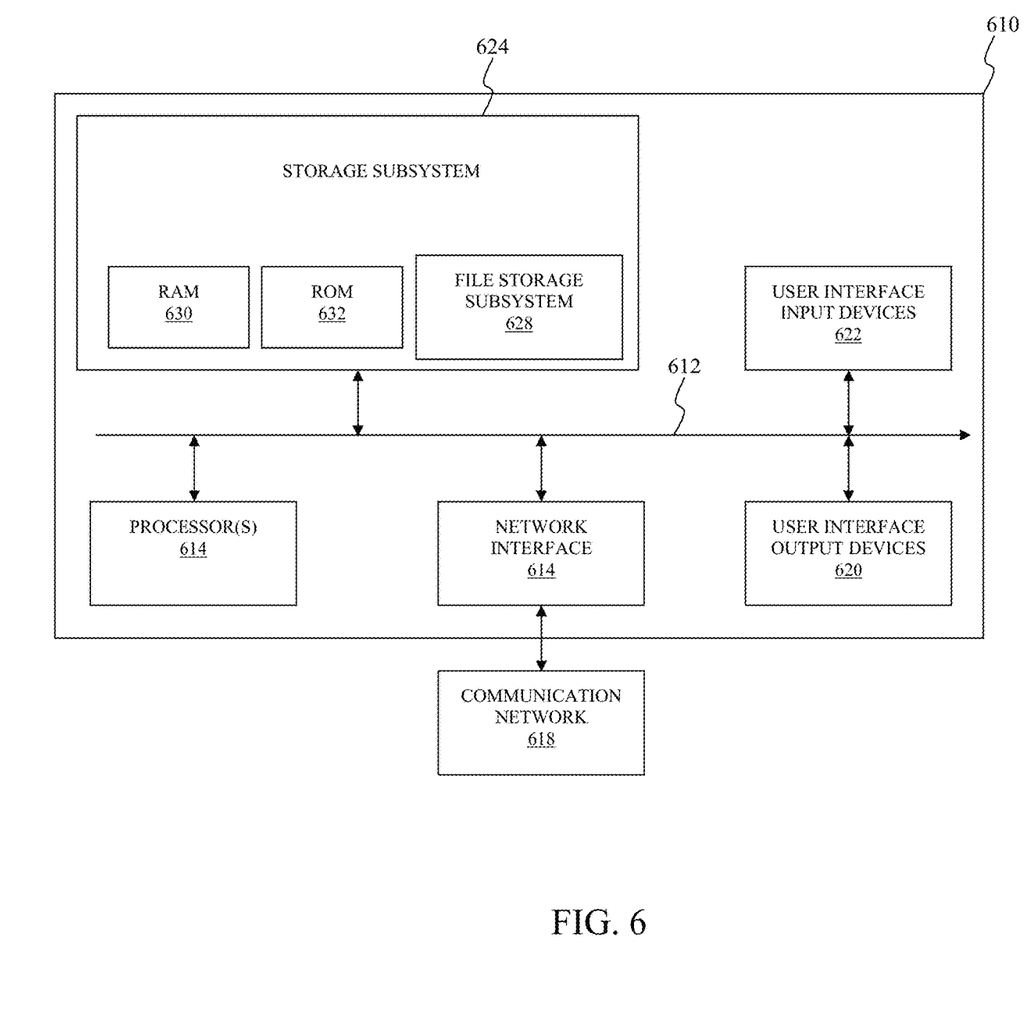
FIG. 6 graphically illustrates a simplified block diagram of a computer system suitable for use with embodiments described herein, as well as circuit design and circuit embodiments of the technology, according to an exemplary embodiment of the present disclosure.

Exemplary Computer System that can be Utilized within the Exemplary Service Provider Network FIG. 6 graphically illustrates a simplified block diagram of a computer system suitable for use with embodiments described herein, as well as circuit design and circuit embodiments of the technology, according to an exemplary embodiment of the present disclosure. The various electronic devices, for example, the service provider system 202 and/or the portable diagnostic system 116, as described above can be implemented in hardware, firmware, software, or any combination thereof. The discussion of FIG. 6 to follow describes an exemplary computer system 610 that can be used for these electronic devices.

In the exemplary embodiment illustrated in FIG. 6, the computer system 610 typically includes at least one processor 614 which communicates with a number of peripheral devices via bus subsystem 612. Typically, the at least processor 614 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 6, these peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. In the exemplary embodiment illustrated in FIG. 6, the network interface subsystem 616 provides an interface to outside networks, including an interface to a communication network 618, and is coupled via a communication network 618 to corresponding interface devices in other computer systems or machines. The communication network 618 may comprise many interconnected computer systems, machines and communication links. These communication links may be wired links, optical links, wireless links, or any other devices for communication of information. The communication network 618 can be any suitable computer network, for example a wide area network such as the Internet, and/or a local area network such as Ethernet. The communication network 618 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 622 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 610 or onto the communication network 618. The user interface input devices 622 typically allow a user to select objects, icons, text and the like that appear on some types of user interface output devices, for example, a display subsystem.

The user interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 610 to the user or to another machine or computer system.

The memory subsystem 626 typically includes a number of memories including a main random-access memory ("RAM") 630 (or other volatile storage device) for storage of instructions and data during program execution and a read only memory ("ROM") 632 in which fixed instructions are stored. The file storage subsystem 628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 628.

The bus subsystem 612 provides a device for letting the various components and subsystems of the computer system 610 communicate with each other as intended. Although the bus subsystem 612 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method for detecting an impairment within a service provider network, the method comprising:
   receiving, by one or more computer systems within the service provider network, an inquiry from a subscriber of a service provided by the service provider network whose service is affected by the impairment;
   developing, by the one or more computer systems, a first network record in response to the inquiry to record a performance of the service provider network,
   identifying, by the one or more computer systems, the impairment based upon a difference between the first network record and a second network record that was developed prior to receiving the inquiry; and
   diagnosing, by the one or more computer systems, the impairment within the service provider network.

2. The method of claim 1, wherein the receiving comprises receiving a telephone call, a short message service (SMS) text message, or an electronic mail (email) message from the subscriber.

3. The method of claim 1, wherein the developing comprises developing the first network record to record a snapshot of one or more characteristics, parameters, or attributes of the service provider network that characterize the performance of the service provider network at an instance in time.

4. The method of claim 3, wherein the developing further comprises measuring the one or more characteristics, parameters, or attributes of the service provider network.

5. The method of claim 1, wherein the identifying comprises determining one or more characteristics, parameters, or attributes of the first network record that differ between the first network record and the second network record.

6. The method of claim 5, wherein the diagnosing comprises diagnosing one or more mechanical, electrical, or electromechanical devices within the service provider network as causing the one or more characteristics, parameters, or attributes to differ between the first network record and the second network record.

7. The method of claim 6, further comprising dispatching a service technician to a subscriber premises of the service provider network having the one or more mechanical, electrical, or electromechanical devices to repair or replace the one or more mechanical, electrical, or electromechanical devices.

8. A service provider system for detecting an impairment within a service provider network, the service provider system comprising:
a memory that stores a first network record that was developed prior to receiving an inquiry from a subscriber of a service provided by the service provider network whose service is affected by the impairment; and
a processor configured to execute instructions, the instructions, when executed by the processor, configuring the processor to:
receive the inquiry from the subscriber,
develop a second network record in response to the inquiry to record a performance of the service provider network,
identify the impairment based upon a difference between the first network record and the second network record, and
diagnose the impairment within the service provider network.

9. The service provider system of claim 8, wherein the inquiry comprises a telephone call, a short message service (SMS) text message, or an electronic mail (email) message from the subscriber.

10. The service provider system of claim 8, wherein the instructions, when executed by the processor, configure the processor to develop the second network record to record a snapshot of one or more characteristics, parameters, or attributes of the service provider network that characterize the performance of the service provider network at an instance in time.

11. The service provider system of claim 10, wherein the instructions, when executed by the processor, further configure the processor to measure the one or more characteristics, parameters, or attributes of the service provider network.

12. The service provider system of claim 8, wherein the instructions, when executed by the processor, configure the processor to determine one or more characteristics, parameters, or attributes of the first network record that differ between the first network record and the second network record.

13. The service provider system of claim 12, wherein the instructions, when executed by the processor, configure the processor to diagnose one or more mechanical, electrical, or electromechanical devices within the service provider network as causing the one or more characteristics, parameters, or attributes to differ between the first network record and the second network record.

14. The service provider system of claim 13, wherein the instructions, when executed by the processor, further configure the processor to dispatch a service technician to a subscriber premises of the service provider network having the one or more mechanical, electrical, or electromechanical devices to repair or replace the one or more mechanical, electrical, or electromechanical devices.

15. A service provider system for detecting an impairment within a service provider network, the service provider system comprising:
a service provider server configured to provide a service to a subscriber premises of the service provider system; and
an administrative workstation configured to:
receive an inquiry from a subscriber of the service whose service is affected by the impairment,
develop a second network record in response to the inquiry to record a performance of the service provider network,
identify the impairment based upon a difference between the first network record and the second network record, and
diagnose the impairment within the service provider network.

16. The service provider system of claim 15, wherein the administrative workstation is configured to develop the second network record to record a snapshot of one or more characteristics, parameters, or attributes of the service provider network that characterize the performance of the service provider network at an instance in time.

17. The service provider system of claim 16, wherein the administrative workstation is further configured to measure the one or more characteristics, parameters, or attributes of the service provider network.

18. The service provider system of claim 15, wherein the administrative workstation is configured to determine one or more characteristics, parameters, or attributes of the first network record that differ between the first network record and the second network record.

19. The service provider system of claim 18, wherein the administrative workstation is configured to diagnose one or more mechanical, electrical, or electromechanical devices within the subscriber premises as causing the one or more characteristics, parameters, or attributes to differ between the first network record and the second network record.

20. The service provider system of claim 19, wherein the administrative workstation is further configured to dispatch a service technician to the subscriber premises to repair or replace the one or more mechanical, electrical, or electromechanical devices.

* * * * *